United States Patent [19]

Skarvan

[11] Patent Number: 5,775,089
[45] Date of Patent: Jul. 7, 1998

[54] PRESSURE SIGNAL SYNTHESIS METHOD AND SYSTEM FOR A GAS TURBINE ENGINE

[75] Inventor: Charles Anthony Skarvan, Indianapolis, Ind.

[73] Assignee: Allison Engine Company, Indianapolis, Ind.

[21] Appl. No.: 772,704

[22] Filed: Dec. 23, 1996

[51] Int. Cl.$^6$ ....................................... F02C 9/00
[52] U.S. Cl. ............... 60/39.03; 60/39.281; 60/39.282
[58] Field of Search ................... 60/39.03, 39.24, 60/39.281, 39.282, 243

[56] References Cited

U.S. PATENT DOCUMENTS

| | | |
|---|---|---|
| 3,930,366 | 1/1976 | Nelson . |
| 3,963,372 | 6/1976 | McLain et al. . |
| 3,984,701 | 10/1976 | Pieper . |
| 4,212,161 | 7/1980 | Newirth et al. . |
| 4,228,650 | 10/1980 | Camp . |
| 4,249,238 | 2/1981 | Spang, III et al. . |
| 4,300,348 | 11/1981 | Lewis et al. ............... 60/39.281 |
| 4,307,451 | 12/1981 | Zagranski et al. . |
| 4,453,378 | 6/1984 | Zagranski et al. . |
| 4,522,026 | 6/1985 | Peterson et al. . |
| 4,594,849 | 6/1986 | Kenison et al. ............... 60/39.29 |
| 4,641,517 | 2/1987 | Spock et al. . |
| 4,693,077 | 9/1987 | Skarvan et al. . |
| 4,722,061 | 1/1988 | Carlisle et al. . |
| 4,736,331 | 4/1988 | Lappos et al. . |
| 4,748,804 | 6/1988 | Krukoski . |
| 4,999,991 | 3/1991 | Haddad et al. . |
| 5,274,558 | 12/1993 | High et al. . |
| 5,379,584 | 1/1995 | Windish et al. . |
| 5,394,689 | 3/1995 | D'Onofrio . |
| 5,436,826 | 7/1995 | O'Flarity . |
| 5,447,023 | 9/1995 | Meisner et al. . |

*Primary Examiner*—Louis J. Casaregola
*Attorney, Agent, or Firm*—Woodard, Emhardt, Naughton, Moriarty & McNett

[57] ABSTRACT

A pressure signal synthesis method is provided to accommodate failure of a pressure sensor in a gas turbine engine. The pressure signal is synthesized from the torque produced by the engine, and further determined from the corrected speed of a gasifier rotor and power turbine for a free-turbine engine configuration. The synthesized pressure signal may include a correction factor which accounts for the deviation of the engine from a nominal characteristic. This correction factor is determined during engine operation and periodically updated to account for changes in the deviation.

38 Claims, 3 Drawing Sheets

PRESSURE SIGNAL SYNTHESIS METHOD AND SYSTEM FOR A GAS TURBINE ENGINE

BACKGROUND OF THE INVENTION

The present invention relates to gas turbine engines, and more particularly, but not exclusively, relates to synthesis of a sensor signal for a gas turbine engine.

The proper operation of gas turbine engines often relies on monitoring several engine parameters with corresponding sensors. Typically, sensors are located at several different engine stations. Failure of any of these sensors may cause serious engine operation problems. Consequently, various sensor failure accommodation schemes have been proposed. U.S. patent application Ser. No. 08/473,720, filed on Jun. 7, 1995; and U.S. Pat. Nos. 5,394,689 to D'Onofrio, 4,748,804 to Krukoski, 4,522,026 to Peterson et al., 4,307,451 to Zagranski et al., 4,228,650 to Camp, and 4,212,161 to Newirth et al. are cited as sources of background information concerning various sensor accommodation schemes and are hereby incorporated by reference.

For aircraft powered by gas turbine engines, gas pressure is typically an important parameter that is sensed at one or more engine stations. One possible way to accommodate a failed pressure sensor is to determine a replacement signal from measurements of working fluid characteristics, such as pressure or temperature, at other engine stations where the sensors remain operational. Unfortunately, this approach may not be suitable for all engine systems. For instance, the remaining sensors may not be readily available or accessible, and the addition of sensors for accommodation purposes may not be cost effective. Furthermore, available sensors may not be capable of providing the degree of resolution or reliability desired for the synthesized signal. This situation sometimes arises when the operational sensors are of a type designed for high temperature or high pressure use relative to the failed sensor. In other cases, an additional look-up table is needed to predict the failed sensor signal from surviving sensor signals which may unduly tax engine controller resources. Thus, new systems and methods for synthesizing desired engine pressure signals are in demand.

Moreover, accommodation schemes may rely on a nominal engine performance curve, sometimes called a "schedule" or "characteristic," which provides the quantitative relationship between two or more engine parameters. The accuracy of this curve for a given engine depends on how closely the given engine corresponds to the target design criteria or sample engine (or engines) upon which the curve is based. Thus, it is generally expected that most engines will deviate from a nominal characteristic within an established tolerance—especially as engines age and wear over time. Synthesizing a signal from a nominal characteristic without accounting for the normal deviation of the engine may lead to significant inaccuracy or imprecision in the synthesized signal.

One potential solution to this problem is to test each engine to generate a custom characteristic. This custom characteristic may be configured as a refinement of an existing nominal characteristic or as a substitute for it. Unfortunately, the dedicated testing required to generate the custom characteristic is usually quite costly. Furthermore, the custom characteristic often significantly consumes equipment resources and fails to account for changes in the engine deviation that occur during routine operation. Thus, it is also preferred that new synthesis systems and methods account for engine deviation from nominal without requiring a dedicated test to generate a customized deviation characteristic. The present invention satisfies these needs and provides other important advantages.

SUMMARY OF THE INVENTION

The present invention relates to operation of a gas turbine engine with a synthesized signal configured to replace the signal from an unreliable sensor. Various aspects of this invention are novel, non-obvious, and provide various advantages. While the actual nature of the invention covered herein can only be determined with reference to the claims appended hereto, certain aspects which are characteristic of the preferred embodiment are described briefly as follows.

In one aspect of the present invention, an accommodation process for a gas turbine engine is provided. This process includes sensing a gas pressure associated with operation of the engine, detecting failure of a sensor used to measure the gas pressure, and operating the engine after the sensor failure with the gas pressure being determined as a function of torque produced by the engine. Preferably, for a free-turbine engine application, gas pressure is further determined as a function of rotational speed of the gasifier rotor, rotational speed of the power turbine, and engine inlet temperature. Notably, this process does not require other pressure sensors for synthesis. Among the applications of this process is the synthesis of compressor inlet pressure as a function of torque.

In another aspect of the present invention, a gas turbine engine has a first sensor that provides a first pressure signal corresponding to gas pressure associated with performance of the engine. The system also includes a second sensor that provides a torque signal corresponding to torque produced by the engine. A controller is included that responds to the first pressure signal and torque signal by generating a second pressure signal. The second pressure signal corresponds to the gas pressure and is determined as a function of the torque signal. The controller also generates a failed sensor signal when failure of the first sensor is detected. In response to this failed sensor signal, the controller operates with the second pressure signal in place of the first pressure signal. The second pressure signal may be further determined as a function of the rotational speed of one or more engine components and engine inlet temperature.

In yet another aspect of the present invention, a gas turbine engine is operated by sensing a gas pressure with a sensor to provide a measured pressure signal for operation of the engine in a non-fault mode. A synthesized pressure signal is generated from an engine characteristic representing a nominal relationship between at least two engine parameters. The measured pressure signal and synthesized pressure signal are compared to establish an adjustment signal corresponding to deviation of the engine from the nominal relationship during the non-fault mode. The synthesized pressure signal is corrected with the adjustment signal and used in place of the measured pressure signal during operation of the engine in a fault mode. This fault mode is established when failure of the sensor is detected.

Accordingly, one object of the present invention is to provide a pressure signal synthesis system and method.

It is another object of the present invention to provide an accommodation technique which accounts for deviation of a gas turbine engine from nominal.

Still another object of the present invention is to synthesize a pressure sensor signal as a function of torque produced by a gas turbine engine. Pressure may additionally be determined from rotational speeds of various engine components and engine inlet temperature.

It is yet another object of the present invention to provide a way to synthesize a replacement pressure signal which does not require pressure measurements at other engine stations, and to provide a synthesis algorithm which occupies a minimal amount of memory space in an engine controller.

Further objects, advantages, features, and aspects of the present invention shall become apparent from the detailed description and drawings contained herein.

DESCRIPTION OF THE PREFERRED EMBODIMENT

Figure 1:
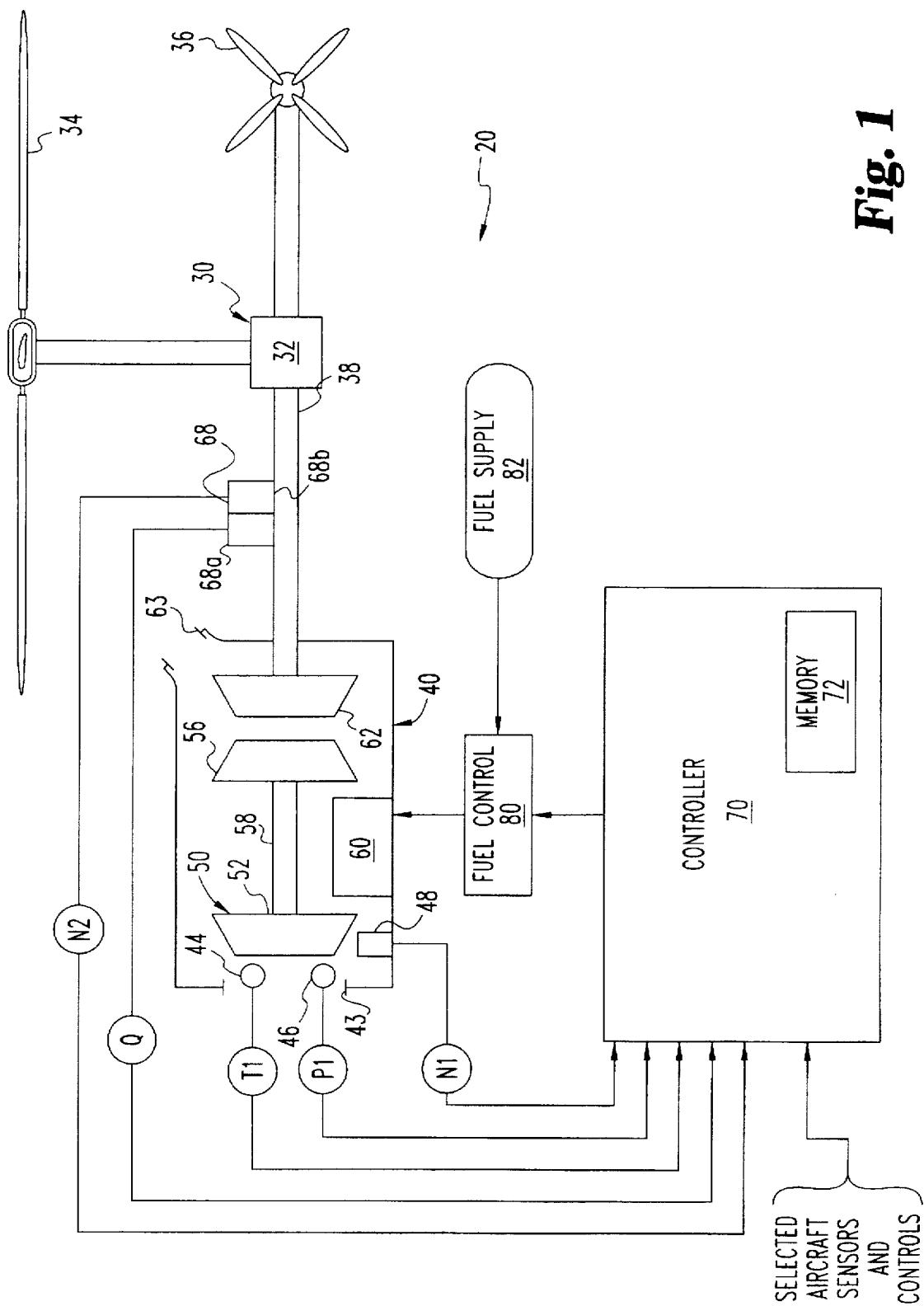
FIG. 1 is a diagrammatic view of an aircraft system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 schematically depicts an aircraft system 20 of one embodiment of the present invention. System 20 includes aircraft propulsion mechanism 30 of the type commonly used for helicopters. Mechanism 30 has a gear box 32 which is configured to turn rotary wing 34 and tail rotor 36. Typically, rotary wing 34 and tail rotor 36 are driven at different rotational speeds. Gear box 32 is driven by shaft 38 which is in turn driven by gas turbine engine 40. Gas turbine engine 40 has inlet 43 for the intake of a working fluid. Adjacent inlet 43 are temperature sensor 44 providing inlet temperature signal T1 and pressure sensor 46 providing inlet pressure signal P1. Sensor 48 of engine 40 registers rotational speed of gas generating spool or "gasifier" spool 50. The rotational speed of spool 50 is provided by sensor 48 as signal N1.

Gas turbine engine 40 is preferably of a free turbine variety with spool 50 having compressor 52 adjacent inlet 43. Compressor 52 is driven by turbine 56 which is connected by spool shaft 58. Compressor 52, turbine 56, and shaft 58 of spool 50 are all configured to rotate together in a conventional manner.

Generally, air is drawn through inlet 43 to serve as a working fluid which is then compressed by compressor 52. Fuel is introduced into the working fluid after discharge from compressor 52 and ignited with combustor 60. The expanding gasses resulting from this combustion turn turbine 56. In response, shaft 58 and compressor 52 are rotated which continues the process as long as air and fuel are appropriately supplied to engine 40. Indeed, the mass flow rate of air and the flow rate of fuel are among the primary factors influencing gas turbine engine performance.

As working fluid departs turbine 56, power turbine 62 is encountered. In response, power turbine 62 rotates and correspondingly turns shaft 38 to drive mechanism 30. The working fluid departing from power turbine 62 exits engine 40 through duct 63 as exhaust. Torque produced by rotation of shaft 38 is detected with dual sensor arrangement 68. Arrangement 68 provides torque as signal Q, and also provides rotational speed of shaft 38 as signal N2. In one embodiment, engine 40 is a model 250 free-turbine engine provided by Allison Engine Company of Indianapolis, Indiana; however, other configurations of gas turbine engine 40 may be employed as would occur to one skilled in the art, including, but not limited to, an arrangement with a single turbine or a multiple compressor/turbine spool arrangement.

In one embodiment of the present invention, dual sensor arrangement 68 may be provided by the torque/rotational speed sensing mechanism disclosed in U.S. Pat. Nos. 3,963,372 to McLain et al., 3,930,366 to Nelson, 3,984,701 to Pieper, or 4,693,077 to Skarvan et al. which are hereby incorporated by reference. Notably, in at least some of these systems, output shaft rotational speed is detected in multiple locations to assist in determining whether the shaft has broken. Typically, only a portion of this type of mechanism needs to be operating properly to detect rotational speed; however, the detection of torque is more sensitive to the behavior of the entire mechanism. As a result, N2 may often be reliably provided even when the Q signal has become unreliable.

In alternative embodiments, Q and N2 may be provided by separate, independent sensors with or without redundancy. For example, in one alternative embodiment, Q may be provided by a conventional hydraulic torque meter with rotational speed of the shaft being detected by one or more separate sensing devices. In still other embodiments, measured signals N1, N2, T1, P1, and Q are provided using conventional techniques and sensing devices as are known to those skilled in the art.

As illustrated in FIG. 1, signals N1, N2, T1, P1 and Q are provided to controller 70 along with various other aircraft sensors and controls. Preferably, these controls include additional engine monitoring signals and pilot-operated inputs such as a Power Lever Angle (PLA) device used to adjust the power output of engine 40.

Controller 70 is comprised of one or more components and includes memory 72. Circuitry for Memory 72 may be combined with circuitry for controller 70 on a single integrated circuit chip, or comprised of one or more separate components of a solid state, electromagnetic, optical, or other variety as would occur to one skilled in the art. Controller 70 may include analog circuitry, digital circuitry, or a hybrid combination of both of these types. In one embodiment, controller 70 is of the programmable variety which executes algorithms or processes data in accordance with software or firmware instructions loaded therein. This embodiment may also have appropriate functions hardwired into one or more logic devices. In another embodiment, controller 70 has substantially all of the functions provided by dedicated hardware. It is preferred that controller 70 be configured to operate as a Full Authority Digital Engine Control (FADEC). Examples of suitable FADECs for the present invention include, but are not limited to, Allison Engine Company's model 250 FADEC and model T800 FADEC.

Controller 70 generates an output demand signal WF to meter fuel flow to engine 40. Fuel control 80 responds to signal WF to regulate the flow of fuel from supply 82 to combustor 60. In one embodiment, controller 70 is configured with an algorithm and a fueling schedule which adjusts WF in accordance with pilot input to controller 70, and signals P1, N1, T1, and N2. Similarly, controller 70 may include an algorithm which responds to signal Q to protect gear box 32 from excessive torque and otherwise indicate loading on shaft 38. In still another embodiment, operation of engine 40 may be controlled with signals N1, N2, T1, P1, and Q using techniques as would occur to those skilled in the art.

Among the operations regulated by controller 70, is compressor inlet pressure synthesis process 120. Process 120 is configured to generate a substitute signal for the sensed P1 signal should sensor 46 fail or otherwise become unreliable. Selected variables of process 120 are briefly introduced as follows:

- CF correction factor to account for deviation of engine 40 from nominal (CFI and CFPAST are intermediate variables corresponding to CF);
- DELTA signal that serves as corrected inlet pressure and a correction factor which is selected from either a measured value, DELTASENSE, or a synthesized value, DSYNCF, in accordance with the present invention (signals DELTASENSE, DCALC, DSYN, DSYNC, DSYNCF, DPAST correspond to DELTA);
- DELTASENSE corrected inlet pressure and correction factor determined in accordance with DELTASENSE= P1/14.696, where P1 is a measured pressure signal determined with sensor 46 and the value 14.696 is a normalization constant corresponding to standard day pressure, both P1 and the 14.696 constant are in units of psia so that DELTASENSE is unitless;
- N1 engine gasifier spool 50 rotational speed determined from sensor 48, (typically in units of RPM or %, where N1=100% represents a specific pre-determined rotational speed);
- N1C N1 corrected to temperature T1 (typically in units of RPM or %) in accordance with N1C=N1/(SQRT(THETA));
- N1DOT first derivative with respect to time of N1 indicating rate of change of N1 (typically in units of RPM/sec., radians/sec.$^2$, or %/sec.);
- N2 power turbine 62 and drive shaft 38 rotational speed from arrangement 68 (typically in units of RPM or %, where N2=100% represents a specific, pre-determined rotational speed);
- N2C N2 corrected to temperature T1 (typically in units of RPM or %) in accordance with N2C=N2/(SQRT(THETA));
- N2DOT first derivative of N2 with respect to time indicating rate of change of N2 (typically in units of RPM/sec., radians/sec.$^2$, or %/sec.);
- P1 compressor inlet pressure measured with sensor 46 (typically in units of psia);
- P1FAIL discrete signal indicating faulty P1 sensor 46;
- Q engine output shaft torque determined from arrangement 68 (typically in units of ft-lbs);
- QCALC derived value of output torque from an engine characteristic (typically in units of ft-lbs);
- T1 inlet temperature determined from sensor 44 (typically in units of degrees Rankine, °R);
- THETA correction factor determined in accordance with THETA=T1/518.7, where T1 is a measured inlet temperature and the value 518.7 is a normalization constant corresponding to standard day ambient air temperature, both T1 and the 518.7 constant are in units of degrees Rankine (°R) so that THETA is unitless;
- SEL1 discrete intermediate selection signal; SQRT() is a square root operator which returns the square root of the argument enclosed in the parenthesis. Furthermore, process 120 employs constants C1, C2, C3 in various conditional operations as described hereafter.

Figure 2:
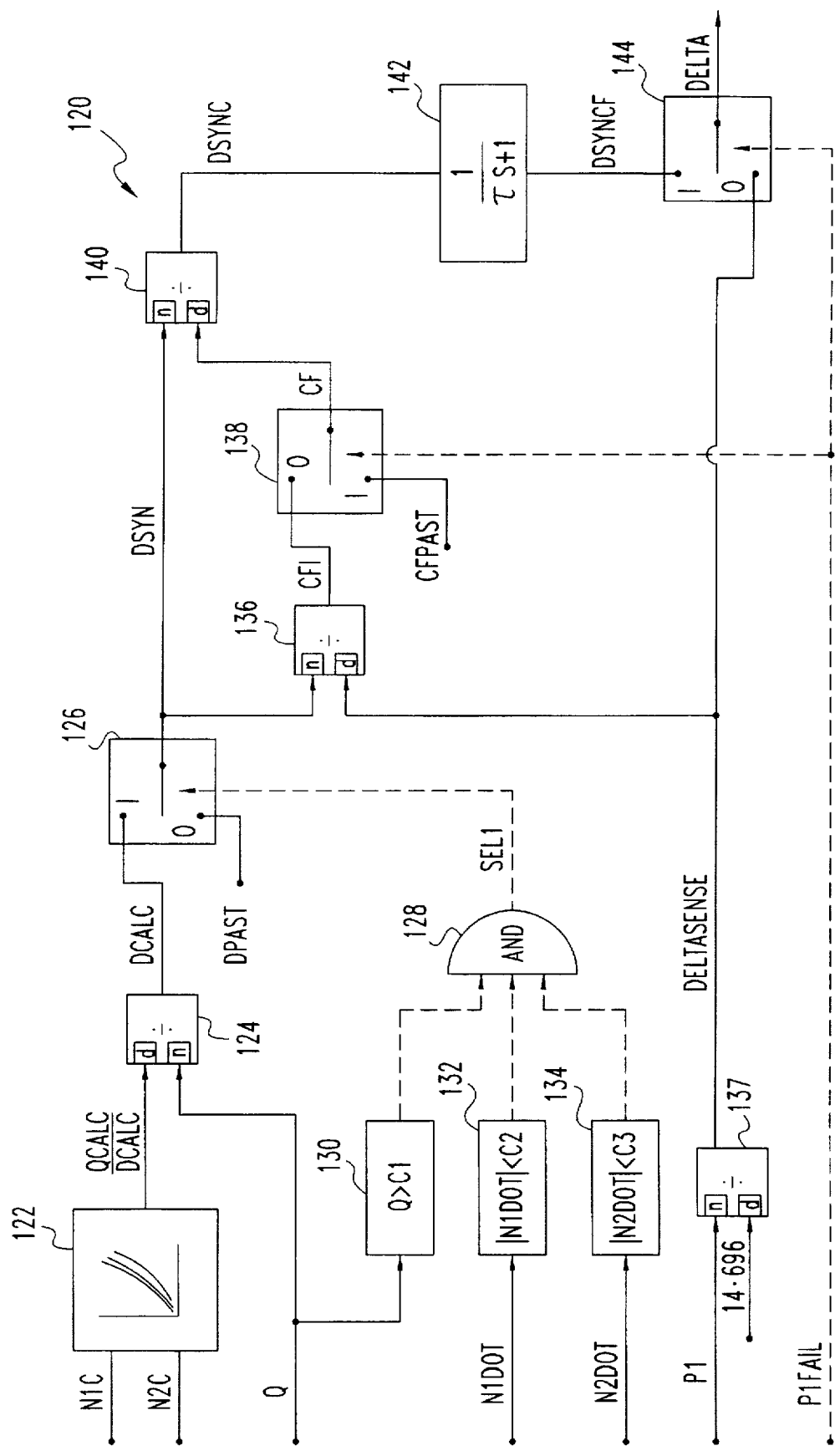
FIG. 2 is a signal flow diagram depicting a signal synthesis process for the embodiment of FIG. 1.
Figure 3:
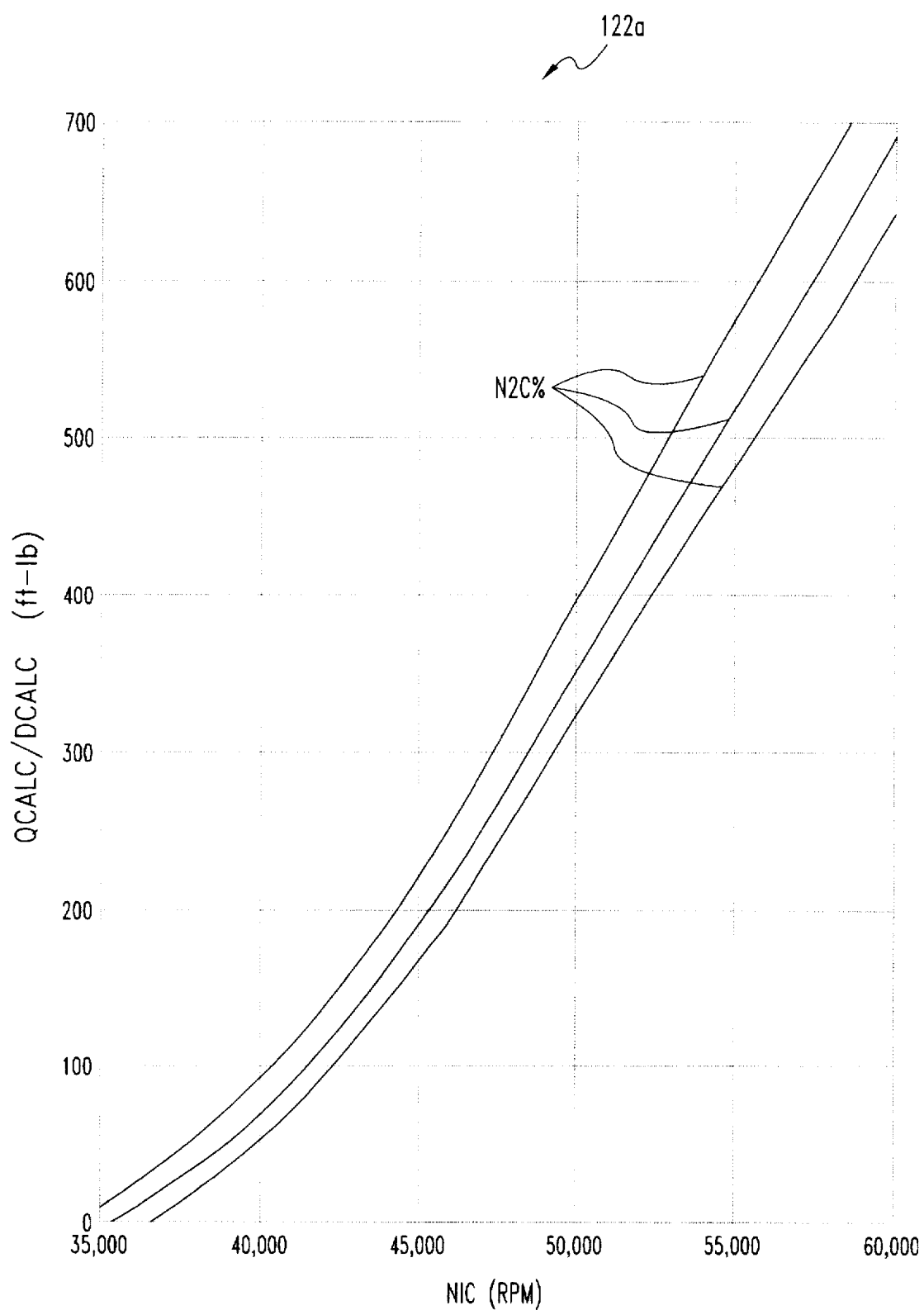
FIG. 3 is a graph depicting a representative engine characteristic for the process depicted in FIG. 2.

Referring to FIGS. 2 and 3, process 120 is further discussed. In FIG. 2, solid lines represent signals which may have a range of different levels or values and dashed lines represent discrete signals having two states, active and inactive, corresponding to 1 and 0. The lower case letters "n" and "d" represent numerator (n) and denominator (d), respectively, of various division operators illustrated in FIG. 2.

Function 122 generates an output from a nominal characteristic 122a for engine 40. FIG. 3 further depicts characteristic 122a for a particular embodiment of the present invention having an Allison Engine Company model 250–C20B free-turbine configuration for engine 40. Along the vertical axis of characteristic 122a is the ratio QCALC/DCALC, where QCALC and DCALC are nominal characteristic values corresponding to torque and the delta correction factor. Along the horizontal axis is corrected N1 speed, N1C, where N1C=N1/(SQRT(THETA)) and THETA=T1/518.7. Characteristic 122a has a number of QCALC/DCALC versus N1C curves (three are illustrated) corresponding to different increments of N2C. N1C and N2C are determined from sensors 44, 48, and 68 using conventional techniques.

Function 122 outputs a selected QCALC/DCALC ratio from the the N1C and N2C inputs. By way of explanation, one way to determine the output QCALC/DCALC as a function of N1C and N2C is to: (1) select the appropriate QCALC/DCALC versus N1C curve with input N2C and (2) apply input N1C to the selected curve to output the corresponding QCALC/DCALC ratio. Notably, the QCALC/DCALC output may be interpolated when N2C lies between available increments.

The output QCALC/DCALC ratio is then input as denominator (d) to divider 124. The numerator (n) input to divider 124 is the measured torque, Q, from arrangement 68. As a result, divider 124 outputs an estimate of the corrected inlet pressure ratio as a function of the nominal characteristic corrected torque (QCALC/DCALC) and the actual torque, Q. Similarly, the synthesized P1 may be determined as a function of DCALC.

The output of divider 124 flows to selector 126. Selector 126 operates similar to a single pole, single throw switch under control of discrete signal SELL which determines the "switch" position. When SEL1 is active (SEL1=1), output signal DSYN of selector 126 is set to DCALC (DSYN= DCALC). When SEL1 is inactive (SEL1=0), then DSYN is set to DPAST (DSYN=DPAST). DSYN is stored in DPAST during each active state of SEL1 (SEL1=1) to effectively save the most recent DCALC value that passed through selector 126.

Selector 126 substitutes DPAST for DCALC when N1DOT, N2DOT, or Q signals do not comply with thresholds corresponding to a reliable DCALC value. These conditions are tested by "and" gate 128 which outputs an active SEL1=1 only if all discrete inputs are active. It has been found that relatively low values of Q may propagate large errors in the synthesis of P1 or DELTA when determined therefrom. As a result, function 130 tests for this condition by determining whether Q is greater than a constant threshold C1. If it is greater, then the output of function 130 is active (set to 1) indicating a Q value which is acceptable for synthesis, otherwise the output of function 130 is inactive (set to 0) so that SEL1 is also inactive (SEL1=0). Constant C1 is selected to avoid unacceptably large errors when Q is low. In one embodiment, C1 is at least 30% of the maximum rated torque for the given engine configuration.

Function 132 tests whether the absolute value of N1DOT, the first time derivative of N1, is below limit C2. Similarly, function 134 tests whether the absolute value of N2DOT, the first time derivative of N2, is below limit C3. The N1DOT and N2DOT signals are derived from N1 and N2 using techniques known to those skilled in the art.

As first derivatives, N1DOT and N2DOT reflect the rate of change of N1 and N2 respectively, and generally may be used to detect transient operation of the engine. Because it is preferred that synthesis be based on steady state operation of engine 40, functions 132 and 134 are each configured to output an active state only when the absolute value of N1DOT and N2DOT are below the corresponding transient limits C2 and C3. Conversely, if the absolute value of NLDOT is greater than C2, then the output of function 132 is set to an inactive state which makes SEL1 inactive (SEL1=0). Similarly, the output of function 134 is set to an inactive state if the absolute value of N2DOT is greater than C3, which also makes SEL1 inactive (SEL1=0). Thus, an inactive output by either function 132 or function 134 corresponds to a transient condition undesirable for P1 synthesis. The limits C2 and C3 are selected to avoid unacceptable large transient performance of spool 50 or power turbine 62. Thus, gate 128 provides an active SEL1 output (SEL1=1) only when Q is greater than C1, the absolute value of N1DOT is less than C2, and the absolute value of N2DOT is less than C3; causing selector 126 to pass input signal DCALC through as the output signal DSYN. In contrast, if one or more of the outputs of functions 130, 132, 134 are inactive, then SEL1 is inactive (SEL1=0), and selector 126 passes through input signal DPAST as output signal DSYN.

It should be appreciated that engine 40 preferably generates signal DSYN even before failure or unreliable operation of sensor 46 is detected. During this non-fault mode, a correction factor is determined and periodically updated. This correction factor compensates for the deviation of engine 40 from the nominal characteristic of function 122. The instantaneous correction factor, CFI, is determined with divider 136. Signal DSYN is input to divider 136 as a numerator (n) and signal DELTASENSE is input to divider 136 as denominator (d). Divider 137 outputs DELTASENSE in response to numerator (n) input P1 and a correction constant denominator (d) input of 14.696 such that DELTASENSE=P1/14.696 is the corrected compressor inlet pressure determined from sensor 46.

Output signal CFI of divider 136 is the ratio of DSYN to DELTASENSE (CFI=DSYN/DELTASENSE). During non-fault operation, this ratio effectively compares the synthesized and measured signals to provide the relative amount the engine deviates from nominal. Preferably, through periodic updates during engine operation, this ratio accounts for variation of engine deviation over time due to such factors as aging or wear.

Selector 138 receives CFI and CFPAST as inputs. A faulty P1 sensor is indicated by activation of a discrete signal P1FAIL which controls the routing of selector 138. Specifically, the output of selector 138 is CF=CFI during non-fault operation (P1FAIL=0) and CF=CFPAST during a fault mode of operation (P1FAIL=1).

When the P1 sensor fails, such that DELTASENSE is no longer trustworthy, then P1FAIL becomes active (P1FAIL=1) and selector 138 switches so that CF=CFPAST for this faulted mode. Signal CF is stored in CFPAST while P1FAIL=0 to effectively maintain the most recent value of CFI passed through selector 138. Thus, when P1FAIL=1, CFPAST is "frozen" to the value of the most recent output signal CF before the failure was determined. Signal CF is maintained at the constant CFPAST value throughout the activation of the accommodation mode, or fault mode indicated by P1FAIL=1. Failure or unreliability of the P1 sensor, as indicated by P1FAIL, may be detected using a detection scheme that tests whether P1 or DELTASENSE has exceeded an expected range of values, rate of change, or using such other techniques as would occur to one skilled in the art.

The output of selector 138, CF, is provided as denominator (d) input to divider 140. Signal DSYN is provided as numerator (n) input to divider 140. Divider 140 outputs a corrected synthesized signal, DSYNC, which compensates for the engine deviation from the nominal characteristic provided by function 122. It should be noted that during non-fault operation (PFAIL=0), the synthesized delta (DSYNC) and the actual sensed delta (DELTASENSE) are forced to be identical in accordance with the following:

given: (1) CF=DSYN/DELTASENSE,
(2) DSYNC=DSYN/CF,
then through substitution:
(3) DSYNC=DSYN/(DSYN/DELTASENSE)= DELTASENSE.

Specifically, DSYNC=DSYN/CF during non-fault operation (P1FAIL=0) and DSYNC=DSYN/CFPAST during fault mode (P1FAIL=1) where CFPAST is the ratio of DSYN to DELTASENSE (DSYN/DELTASENSE) determined most recently before the failure.

The output of divider 140 is smoothed by filter 142 to eliminate abrupt step changes or other aberrations that may result in undesirable engine performance. Preferably, filter 142 is of a discrete, first order lag configuration. For this embodiment, it is preferred that τ be about 0.4 second. The output of filter 142, DSYNCF, is provided as an input to selector 144.

Selector 144 provides DELTA=DELTASENSE when sensor 46 is reliably providing signal DELTASENSE (P1FAIL=0). Conversely, selector 144 switches in response to a fault condition (P1FAIL=1) so that DELTA=DSYNCF. Thus, DSYNCF effectively replaces DELTASENSE during the accommodation mode of operation. DELTA is used by controller 70 for various control processes and algorithms as needed, whether sourced from the sensor 46 via the DELTASENSE signal or synthesized as the DSYNCF signal from one or more other sensors.

Process 120 may be embedded in hard-wired logic, accomplished using analog signal processing techniques, or a combination of digital and analog processing as appropriate. However, it is preferred that process 120 be provided by a software or firmware routine suitable for execution by a digitally programmable FADEC. It is also preferred that this algorithm be executed on a periodic basis with DPAST and CFPAST being correspondingly updated by DSYN and CF during each periodic execution. The various signals for this embodiment are preferably in a digital form with controller 70 providing appropriate hardware to digitize any of the signals that may originate in an analog form.

Sensors for the present invention preferably provide a signal in either a digital or analog format compatible with associated equipment. Correspondingly, equipment coupled to each sensor is configured to condition and convert sensor signals to the appropriate format, as required. All sensors are of a known construction. It should also be understood that controller 70 includes all the necessary signal conditioning or pre-processing functionality needed to provide the signals used in process 120.

Characteristic 122a may be embedded in memory 72 of controller 70 as a multi-dimensional look-up table with each dimension corresponding to a different one of the input variables. Alternatively, characteristic 122a may be provided using curve-fitting techniques. In one embodiment employing these techniques, a memory-saving polynomial representation of the engine characteristic is provided in the form:

(QCALC/DCALC)=A*(N1C)$^2$+B*(N1C)+C*(N2C)+D*(N1C)*(N2C) +E; where A, B, C, D, and E are constants.

Besides P1, pressure at other stations along a gas turbine engine may be determined as a function of other available engine parameters. For example, ambient pressure at station zero (P0) and the compressor discharge pressure station (P3 or "CDP") are among the pressure readings which may be synthesized in accordance with the present invention. Although measurements of N1, N2, Q, and T1 are required by process 120, all of these measurements may not be needed to provide a suitable synthesized pressure signal in other embodiments of the present invention. By way of non-limiting example, both N1 and N2 may be generally constant relative to the desired degree of accommodation so that measurement of these relatively constant speeds is not necessary to synthesize pressure in accordance with the present invention.

Similarly, although the preferred application of the invention is for a rotary-wing aircraft, other types of aircraft (including turbo-prop propelled vehicles) and other gas turbine engine applications (including ground-based power generation) may be adapted to practice the present invention using techniques known to those skilled in the art. Also, it should be understood that various embodiments of the present invention as disclosed herein and equivalents thereto provide an accommodation means for synthesizing a pressure sensor signal.

As used herein, it should be appreciated that: "parameter," "variable," "value," "constant," "memory space," "threshold," "limit," "output," "input," or "memory location" each generally correspond to a signal within controller 70 of the present invention. Furthermore it should be appreciated that as used herein: "parameter," "variable," "value," "constant," "memory space," "threshold," "limit," "output," "input," or "memory location" each generally correspond to one or more signals within controller 70 of the present invention.

It is contemplated that various operations, stages, conditionals, procedures, thresholds, and processes described in connection with the present invention could be altered, rearranged, substituted, deleted, duplicated, combined, or added to other processes as would occur to those skilled in the art without departing from the spirit of the present invention.

All publications, patents, and patent applications cited in this specification are hereby incorporated by reference. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An aircraft propulsion system, comprising:
   (a) a gas turbine engine;
   (b) a first sensor configured to provide a first pressure signal corresponding to a gas pressure associated with performance of said engine;
   (c) a second sensor configured to provide a torque signal corresponding to torque produced by said engine;
   (d) a controller responsive to said first pressure signal and said torque signal, said controller being configured to generate:
      a second pressure signal corresponding to the gas pressure, said second pressure signal being determined as a function of said torque signal,
      a failed sensor signal when failure of said first sensor is detected; and
   wherein said controller is configured to respond to said failed sensor signal to operate with said second pressure signal in place of said first pressure signal.

2. The system of claim 1, wherein said controller is further configured to generate a deviation signal corresponding to deviation of said engine from a nominal characteristic by comparing said first and second pressure signals, and said second pressure signal is further determined from said characteristic and said deviation signal.

3. The system of claim 1, wherein said engine includes a first turbine configured to rotate a first shaft and a second turbine configured to rotate a second shaft.

4. The system of claim 3, further comprising an aircraft propulsion mechanism configured to be driven by said second shaft, said mechanism including a gear box and a rotary wing.

5. The system of claim 3, further comprising:
   a third sensor configured to provide a first speed signal indicative of rotational speed of said first shaft; and
   a fourth sensor configured to provide a second speed signal indicative of rotational speed of said second shaft.

6. The system of claim 5, wherein said controller is responsive to said third and fourth sensors to further determine said second pressure signal as a function of said first and second speed signals.

7. The system of claim 6, wherein said controller is configured to determine steady state operation of said engine as a function of a rate of change of at least one of said first and second speed signals.

8. The system of claim 6, further comprising a fifth sensor configured to provide a temperature signal corresponding to inlet temperature, said second pressure signal being further determined as a function of said temperature signal.

9. The system of claim 5, wherein said controller includes a memory having a plurality of values corresponding to a relationship between said torque signal, said first speed signal, and said second speed signal.

10. A failure accommodation method for a gas turbine engine, comprising:
    (a) sensing a gas pressure with a pressure sensor, the gas pressure being associated with operation of the engine;
    (b) detecting failure of the pressure sensor; and
    (c) operating the engine after failure of the pressure sensor with the gas pressure being determined as a function of torque produced by the engine.

11. The method of claim 10, wherein said operating includes detecting a deviation of the engine from nominal and correcting for the deviation.

12. The method of claim 10, wherein said operating further includes determining the gas pressure as a function of rotational speed of at least one rotating member of the engine.

13. The method of claim 10, wherein the gas pressure corresponds to inlet pressure of the engine.

14. The method of claim 10, further comprising driving an aircraft propulsion mechanism with the engine.

15. The method of claim 10, wherein said operating includes measuring torque produced by the engine with a torque sensor.

16. The method of claim 15, wherein said operating includes:

determining the gas pressure from an engine characteristic corresponding to a nominal relationship of engine torque and rotational speed of at least one rotating engine member;

adjusting for a deviation of the engine from nominal; and driving an aircraft propulsion mechanism with the engine.

17. A method of operating a gas turbine engine, comprising:

(a) providing a first signal representing torque produced by the engine;

(b) sensing a gas pressure associated with performance of the engine, said sensing being performed with a sensor providing a second signal corresponding to the gas pressure;

(c) generating a third signal corresponding to the gas pressure from the first signal; and (d) using the third signal in place of the second signal if the sensor fails.

18. The method of claim 17, wherein the gas pressure corresponds to inlet pressure of the engine.

19. The method of claim 17, wherein said generating includes establishing a deviation of the engine from nominal by comparing the first and third signals before the sensor fails and correcting for the deviation.

20. The method of claim 17, wherein said generating includes referencing a characteristic relationship of the engine defined by a number of values.

21. The method of claim 20, wherein the values correspond to a number of coefficients of a polynomial.

22. The method of claim 17, wherein the engine has a first turbine and a second turbine, and said generating includes:

sensing rotational speed of the first turbine to provide a corresponding fourth signal;

sensing rotational speed of the second turbine to provide a corresponding fifth signal;

sensing engine inlet temperature to provide a corresponding sixth signal; and determining the third signal as a function of the fourth, fifth, and sixth signals.

23. The method of claim 22, further comprising establishing steady state operation of the engine as a function of a rate of change of at least one of the fourth and fifth signals.

24. An aircraft propulsion system, comprising:

(a) a gas turbine engine;

(b) a pressure sensor configured to provide a first signal corresponding to a gas pressure associated with performance of said engine;

(c) a torque meter configured to provide a second signal corresponding to torque produced by said engine; and (d) a controller responsive to said first and second signals, said controller including an accommodation means for synthesizing a pressure sensor signal from said second signal to substitute for said first signal when said first sensor fails.

25. The system of claim 24, wherein said gas pressure corresponds to inlet pressure of said engine.

26. The system of claim 24, wherein said controller is further configured to generate a fuel flow control signal as a function of said first signal.

27. The system of claim 24, further comprising an aircraft propulsion mechanism configured to be driven by said engine, said mechanism including a gear box and a rotary wing.

28. The system of claim 24, wherein said engine includes a first turbine configured to rotate a first shaft and a second turbine configured to rotate a second shaft.

29. The system of claim 28, further comprising:

a third sensor configured to provide a first speed signal indicative of rotational speed of said first shaft; and a fourth sensor configured to provide a second speed signal indicative of rotational speed of said second shaft.

30. The system of claim 29, further comprising a temperature sensor configured to provide a temperature signal corresponding to inlet temperature of said engine.

31. The system of claim 30, wherein said controller is configured to synthesize said pressure sensor signal in accordance with said first speed signal, said second speed signal, and said temperature signal.

32. An operation method for a gas turbine engine, comprising:

(a) sensing a gas pressure with a sensor to provide a measured pressure signal for operation of the engine in a non-fault mode;

(b) generating a synthesized pressure signal from an engine characteristic representing a nominal relationship between at least two engine parameters;

(c) comparing the measured pressure signal and synthesized pressure signal to establish an adjustment signal corresponding to deviation of the engine from the nominal relationship during the non-fault mode; and (d) correcting the synthesized pressure signal with the adjustment signal and operating the engine with the synthesized pressure signal in place of the measured pressure signal during a fault mode of engine operation, the fault mode being established when failure of the sensor is detected.

33. The method of claim 32, wherein the gas pressure corresponds to inlet pressure of the engine and one of the parameters corresponds to torque produced by the engine.

34. The method of claim 32, wherein the engine has a first turbine and a second turbine, and said generating includes sensing a first rotational speed of the first turbine and a second rotational speed of the second turbine.

35. The method of claim 34, wherein the characteristic includes a first parameter corresponding to the first rotational speed, a second parameter corresponding to the second rotational speed, and a third parameter corresponding to torque produced by the engine.

36. The method of claim 35, further comprising establishing steady state operation of the engine in accordance with a rate of change of at least one of the first and second rotational speeds.

37. The method of claim 32, further comprising driving an aircraft propulsion mechanism with the engine.

38. The method of claim 32, further comprising measuring torque produced by the engine with a torque sensor.

* * * * *